(12) United States Patent
Bougdanos (10) Patent No.: US 9,060,629 B2
(45) Date of Patent: Jun. 23, 2015

(54) TEA CUP AND METHOD OF MANUFACTURING A TEA CUP

(76) Inventor: Laura Bougdanos, Espoo (FI)

( * ) Notice: Subject to any disclaimer, the term of this patent is extended or adjusted under 35 U.S.C. 154(b) by 411 days.

(21) Appl. No.: 13/504,909

(22) PCT Filed: Oct. 29, 2010

(86) PCT No.: PCT/FI2010/000066
§ 371 (c)(1),
(2), (4) Date: Apr. 27, 2012

(87) PCT Pub. No.: WO2011/051541
PCT Pub. Date: May 5, 2011

(65) Prior Publication Data
US 2012/0210877 A1    Aug. 23, 2012

(30) Foreign Application Priority Data

Oct. 30, 2009   (FI) ..................................... 20096124

(51) Int. Cl.
*A47J 31/00*       (2006.01)
*A47G 19/22*       (2006.01)
(Continued)

(52) U.S. Cl.
CPC ............. *A47G 19/22* (2013.01); *A47J 31/0636* (2013.01); *A47G 19/16* (2013.01)

(58) Field of Classification Search
CPC ..... A47G 19/14; A47G 19/16; A47J 31/0636; A47J 31/18
USPC ............ 99/323, 317, 322, 318, 316; 220/703, 220/710.5; 206/0.5, 217
See application file for complete search history.

(56) References Cited

U.S. PATENT DOCUMENTS 132,558 A * 10/1872 Atterbury ...................... 220/771
240,402 A *  4/1881 Gee .................................. 99/322
(Continued)

FOREIGN PATENT DOCUMENTS

CN     201029690 Y    3/2008
CN     201143082 Y    11/2008
(Continued)

*Primary Examiner* — Reginald L Alexander
(74) *Attorney, Agent, or Firm* — David A. Guerra (57) ABSTRACT

The tea cup (1) of the invention is used with a pocket (2) that includes a sieve (3) for tea material. The tea cup (1) has a functional shape achieved with two bottom sides (6,7) enabling the tea cup (1) to be placed in two different positions. The pocket (2) is designed so that it forms a tea compartment (4), which is attached to the inner wall (5) of the cup (1). The tea compartment (4) is integrally or detachably inserted in the tea compartment (4) at the upper part of the cup (1) on the same side as one of the bottom sides (6). This arrangement enables the tea compartment (4) to be on vertically different levels with respect to a water surface (or a tea surface) (11) in the cup (1) when the tea cup (1) is tilted in said different positions constituting a tea-making position and a drinking position in order to make tea of sufficient strength. The placement of the tea compartment (4) thus enables a functionality with respect to these positions. In the tea-making position, tea material inserted in the tea compartment (4) is in contact with the water in the cup (1), whereas in the drinking position, the tea material is intended to be above the water (or tea) surface (11). In the method of the invention for manufacturing the tea cup the tea cup part and the tea department part separately, whereafter a tea sieve is fastened to the tea compartment, and the tea compartment with the metal sieve is manufactured as a part that can be placed to the inner wall of the tea cup.

18 Claims, 6 Drawing Sheets

(51) Int. Cl.
*A47J 31/06* (2006.01)
*A47G 19/16* (2006.01)

(56) References Cited

U.S. PATENT DOCUMENTS

| | | | | |
|---|---|---|---|---|
| 2,591,606 | A | * | 4/1952 | Reed ................................ 99/316 |
| 3,657,994 | A | * | 4/1972 | Post ................................. 99/323 |
| 2007/0121702 | A1 | * | 5/2007 | LaGuardia et al. ............ 374/150 |
| 2007/0187420 | A1 | * | 8/2007 | Gruskin et al. ................. 220/771 |
| 2008/0078825 | A1 | * | 4/2008 | Puls et al. ...................... 229/403 |

FOREIGN PATENT DOCUMENTS

| | | | |
|---|---|---|---|
| CN | 201290529 Y | | 8/2009 |
| DE | 9212592.1 | * | 8/1993 |
| GB | 1366136 A | | 9/1974 |
| JP | 7298973 A | | 11/1995 |
| JP | 2008043715 A | | 2/2008 |
| KR | 20100024560 A | | 3/2010 |

* cited by examiner

TEA CUP AND METHOD OF MANUFACTURING A TEA CUP

CROSS-REFERENCE TO RELATED APPLICATIONS

This application is an U.S. national phase application under 35 U.S.C. §371 based upon co-pending International Application No. PCT/FI2010/00066 filed on Oct. 29, 2010. Additionally, this U.S. national phase application claims the benefit of priority of co-pending International Application No. PCT/FI2010/00066 filed on Oct. 29, 2010 and Finland Application No. 20096124 filed on Oct. 29, 2009. The entire disclosures of the prior applications are incorporated herein by reference. The international application was published on May 5, 2011 under Publication No. WO 2011/051541A1.

FIELD OF THE INVENTION

The invention is concerned with a tea cup having a pocket with a sieve for tea material. The pocket is designed to form a tea compartment attached to the inner wall of the cup. The tea cup has a functional shape achieved with a V-like-shaped base, which enables the tea cup to be placed in two separate standing positions one for brewing and another neutral position for drinking the tea.

BACKGROUND OF THE INVENTION

Tea is normally made by means of tea bags or by pouring water through tea blades/leaves or keeping water in contact with the tea blades in different containers and, thereafter removing the container from the tea cup. Problems with the existing solutions are the need for the hassling removal of the tea bag or the container from the tea before drinking, the unpractical filling and cleaning of the tea bags and containers and the difficulty of getting the right concentration of the tea. In addition, the containers containing the tea material are often not very tight, whereby tea material runs to the tea water.

Different versions to improve ordinary solutions have been presented in several publications.

JP7298973 discloses a tea cup with an own integral department for tea blades. The department is located in the upper part of the cup and has a strain hole meant to be above the water surface. The concentration of the tea can be freely adjusted by inclining the cup flow back to a hot water reservoir.

DE3740397 and DE8028998U present tea pots with a removable straining insert for tea blades. The teapot can be placed in two positions; one in which the tea blade department is above the water surface and another, wherein it is under it. Thus, it should be possible to adjust the concentration of the tea.

JP2008043715 discloses a tea pot to be used with a net cage with tea blades or with a tea bag which is hanging at the input for hot water. The teapot can be placed in two positions by means of two bottoms. An additional support is used for the second position. In the first position, the tea pot is upright and tea leaves are soaked into the water to make the tea. In the other position, by making use of the second bottom, the tea pot is inclined on the table so that the net cage is separated from the water under it and thereby preventing left-over contents from being extracted and left over tea leaves from outflowing. By means of that it also forms a barrier between the water under it.

JP2007325833, JP10014739, CN2416793Y and CN2416793Y present tea cups with an own integral department for tea blades. The departments are both located inside the cup and consist of a pocket-like department or an inclined wall. The separating inclined wall of the department is porous so that water having been in contact with tea leaves could pass through.

SUMMARY OF THE INVENTION

The tea cup of the invention is used with a pocket that includes a sieve for tea material. The tea cup has a functional shape achieved with two bottom sides (V-like-shaped base) enabling the tea cup to be placed in two different positions.

The pocket is designed so that it forms a tea compartment, which is attached to the inner wall of the cup. The tea compartment is integrally or detachably inserted in the tea compartment at the upper part of the cup on the same side as one of the bottom sides. This arrangement enables the tea compartment to be on vertically different levels with respect to a water surface (or a tea surface) in the cup when the tea cup is tilted in said different positions constituting a tea-making position and a drinking position in order to make tea of sufficient strength. The placement of the tea compartment thus enables a functionality with respect to these positions. In the tea-making position, tea material inserted in the tea compartment is in contact with the water in the cup, whereas in the drinking position, the tea material is intended to be above the water (or tea) surface. The tea cup can be tilted in said different positions constituting a tea-making position and a drinking position in order to make tea of sufficient strength, which gives a unique possibility to regulate the tea concentration.

Different embodiments of the tea cup has the characters of the subclaims.

The tea cup of the inventions, can e.g. be made of ceramics, plastics or metal.

In the method of the invention for manufacturing the tea cup, the tea cup part and the tea department part are made separately, where after a tea sieve is fastened to the tea compartment, and the tea compartment with the metal sieve is manufactured as a part that can be placed to the inner wall of the tea cup.

Alternatively, the pocket can first be attached to the cup and thereafter the sieve can be placed therein. Sieves can also be changed.

For making a tea cup of metal or plastic, the tea cup part and the tea department part can be made separately by e.g. injection molding, and the tea sieve can be fastened to the tea compartment by ultrasonic welding during the injection molding step. Thereafter, the tea compartment is integrally welded to the metal sieve to the inner wall of the tea cup.

For making a tea cup of ceramics, the tea compartment is preferably manufactured as a part that can be detachable placed to the inner wall of the tea cup.

An important idea of the invention, distinguishing it from prior tea cups, is the design of a functional shape enabling the cup to take two stable functional positions by means of the fact that it has two planar sides, each of which can work as the bottom of the cup. The functional intention with these two positions is that they enable tea making by tilting (in addition to pouring water through the leaves) and the tea concentration to be regulated even during drinking.

The invention can be further characterized by means of the idea of how the exact cup dimensions and their relations (such as symmetry) to each other are functionally designed. Also the volume of the cup is of interest. For example for one such design embodiment, a volume of ca 3 dl for the tea cup has found to be a proper tea cup size.

The tea cup of the invention has inside it a pocket with a metal sieve for the tea material. The pocket is designed to form a separate tea compartment attached to the inner wall of the cup.

A temperature gauge indicator can be built in or attached to one of the sides of the tea cup. This indicates water temperatures critical for different tea material when in drinking position and informs when to tilt to the brewing position at the right temperature. The core innovative function is to simplify tea brewing considering that tea leaves have various sensitivities to different water temperatures. This temperature gauge indicator gives a signal to the user to tilt the cup in the brewing position when the temperature is right for the corresponding tea material. For example black tea should be brewed at a temperature of 90° C. and oblong-tea needs a temperature of 80° C.

In order to make tea of sufficient strength, the tea compartment is integrally or detachably inserted in the tea compartment at the upper part of the cup on the same side as one of the bottom sides. Then the tea compartment can be on vertically different levels with respect to a water surface in the cup when the tea cup is tilted in said different positions. When the tea cup is tilted to lye on the bottom side that is on the same side as the tea compartment, then the tea cup is in the tea-making position. When the tea cup is tilted to lye on the other bottom side that is on the opposite side as the tea compartment, then the tea cup is in the tea-drinking position. In the tea-making position, tea material inserted in the tea compartment is in contact with the water in the cup, since the tea compartment is on vertically lower level. In the drinking position, the tea material is intended to be above the water surface, since if desired strength of tea has been achieved, the tea leaves should not be in contact with the water (now tea) anymore, and the tea compartment is on vertically higher level above the water surface. Naturally, the tea can be strengthened even after that by just titling the cup back and forth between the two positions. During the tea concentration regulation during e.g. drinking a better term for water surface could be tea surface.

The tea cup material can e.g. be ceramics, plastics or metal, each alternative having its own advantages.

Since the product is a tea cup, in which hot water is poured, and which is in contact with metal spoons and which has to be easily machine washed, a natural choice of material is glazed ceramics. It is, however, difficult to attach an other part permanently to a ceramic cup. Tealeaves somehow have to be separated from water with a water permeable sieve with an area large enough. A metal wire net with holes of 0.15 mm size works well.

The tea compartment can be made as a separate piece, whereby it can be removable or it can be constructed as an integral part of the cup, when manufactured of a suitable material allowing such an alternative, such as plastics.

In the invention, when the cup is made of ceramics, a separate detachable tea compartment part is preferably used, which is attached to the cup for tea making. It is not necessary to remove it at all before cleaning and it can be attached during the drinking of the tea.

Ceramic material conducts well the heat of the hot water to the surface of the cup. A cup filled with just boiled hot water feels unpleasantly hot. To avoid hand contact to the hot surface of the cup, the cup of the invention can have a traditional tea cup handle, or the tea cup can be designed in away to allow gripping, or as a third alternative, the cup of the invention can have a double-wall "thermos" structure or a separate part around the cup made of insulating material such as thermo- plastics. An additional feature is the forming of a cavity in the bottom to facilitate keeping the cup in one hand. For being comfortable for both right and left handed users, there can be handles in both sides of the cup. When the tea compartment is detachable left and right handed persons can just change the place of the attachment of the tea compartment to the opposite side of the cup. Naturally, in the scope of the idea of the invention, the place of the handle can vary for example in accordance with how it is thought that the tea is drunk from the cup. A primary idea is to place the mouth of the opposite side of the cup on its lowest part, but the tea compartment can also be at either side.

Another additional feature is a lid, either on the compartment only (if wanted to hide away tea bag or tea blades, which is not necessarily desired if high tea quality is used) or on the whole cup.

When the cup is made of plastics, the tea compartment can be an integral part of the tea cup. Using plastic for the tea cup material has also other several advantages. Plastic itself works as an insulator. When using polypropylene (PP) as the plastic material, a wall thickness of 3-4 mm insulates the unpleasant heat wall sufficiently. Glass mineral can be added to the plastic material to make the plastics more rigid and durable, especially needed for polypropylene. Another alternative is to use polycarbonate (PC) as the plastic material, which is a high quality thermoplastic with good resistance against abrasion, heat and chemicals.

With the tea cup of the invention, it is possible to make tea with two different tea making techniques, by tilting or pouring water through tealeaves. The former alternative makes it possible to regulate the strength of the tea by tilting the cup. Of course these methods can be used simultaneously also. If you for example, either after tilting or pouring, have noticed that the tea after tasting does, not have sufficient strength, the strength can be increased by tilting the cup. The invention allows an easy regulation of tea concentration since tea of desired strength can be prepared an enjoyed after tealeaves and water have been added into the cup.

The cup of the invention can be designed in many different ways. A symmetric shape is usable for the cup also of the reason that it is not possible to overflow the cup since the overall water level is the same in both positions. There is furthermore no need for water level marks since the cup shape itself guides the use. A curved shape of the cup edge emphasizes the tilting function following the water line and cuts of the extra wall material.

A low and wide cup shape has been found to be a good design since it makes the product to look like a tea cup. A low and wide cup shape optimizes the tilting functionality—it is then possible to move enough water through the sieve by tilting, it is possible to make the tea compartment volume large enough with a minimum tilting angle. A wide cup shape also makes it possible to realize a large sieve area for sufficient water circulation. In a wide cup, the opening of the compartment wall is also wide making pouring tealeaves and water to tea compartment easy. In addition, a low and wide cup shape makes the cup stabile since there is then enough bottom area to keep the cup steady in both positions. In a wide cup shape, the distance between the tea compartment wall and the cup wall stays long and the nose does not hit the compartment wall when drinking the last drops of the tea.

Generally, the appearance of the tea cup of the invention is stylish, being minimalistic when without outstanding handles. The cup shape itself is expressive and formed following the function. No extra shapes and parts are wanted.

The tea cup is most preferably manufactured with the new inventive method for making this tea cup also claimed. The manufacturing method is based on injection molding/ultrasonic welding especially developed for making this tea cup.

In the integral alternative, when the tea cup material is plastics or metal, preferably plastics, the cup part and the tea compartments parts are injection molded. The metal sieve is ultrasonic welded to the tea compartment during the injection molding. Next, this tea compartment part now including the metal sieve is fastened to the cup by ultrasonic welding as well. The method of the invention enables an integral monolithic structure to be achieved for the cup.

In the alternative, wherein a detachable tea compartment is used, when the tea cup material is ceramics, the tea cup part is manufactured by e.g. throwing or other known method for doing ceramic shapes. The tea compartment is realized with a metal sheet or a plastic piece and is permanently fastened by e.g. welding to the metal sieve.

The tea cup of the invention is in many ways more practical than earlier prior art cups. It enables the compartment to be filled with tea very easily. The removing of the sieve can be avoided without the hazzle with teabag or tealeaves, which in prior art method have to be removed before the drinking of the tea. The tea material can, however, also be removed very easily if desired.

The preferable water level in the cup of the invention is near the wall edge only on one side. A tray can be slightly tilted to control the water level on that side where the wall edge is low. If there are several cups on a tray, they can be positioned coaxial in order to utilize this feature. If the cup is in a brewing position, the tea compartment with tealeaves diminishes the water movement efficiently, and carrying feels safe. The cup is stable when carried on a tray.

The shape of the cup and its compartment enables other functionality than just the tea making itself, like ceremonial and decoration functions The nice appearance and new way of preparing the tea enable ceremonial and decoration possibilities and gives a holistic experience for the whole tea drinking ceremony. A holistic experience praises tea enthusiasts' senses with respect to touch, visual impression and odor. The tea can be seen while brewing and be enjoyed and the tea quality can be felt. Different tea qualities look different in color and size and there are special teas with added particles of fruit and small flowers. Tea and added particles also swell and change shape while brewing. There is no need to hide tea of high quality. The tea cup of the invention reveals also other positive aspects in relation to the tea time experience. Since the tea is visible all the time, the tea drinker is aware of the tea with all senses, a holistic experience which earlier has been present in oriental tea cultures. The tea cup of the invention can be seen as a modern answer to contemporary, high quality urban tea culture.

The issues of the functionally successful tea cup of the invention can be summed up to involve one or all of three main areas, i.e. the possibility to make tea of desired strength in different ways by means of the two-bottom feature, the property of being a safe, usable and working product in all untended use cases and the fact that the tea cup product can be manufactured with a reasonable price with an attractive shape with the inventive method of the invention.

In the following the invention is described by means of figures and by means of some preferable detailed examples.

The invention is not restricted to the details of the examples. One skilled in the art can realize that a lot of functional design alternatives can be made within the scope of the inventive idea that is defined in the claims. One such further functional idea could e.g. be to make, such a cup, wherein the handle is designed to partly from one of the planar bottom sides. Another idea is to design some of the bottom sides so that the cup can be gripped. Thus, a lot of variations of a cup including a handle and or a rim lip or a sleeve can be made. Furthermore, variations of a cup can include non-heat absorbing indentations in order to better hold the cup should more heat absorbing material be used in the manufacturing of the cup such as porcelain and ceramics and stainless steel.

It should also be clear that this cup even if primarily meant for making tea, naturally can be used for making coffee and other drinks requiring filtering why the terms relating to tea is not meant to restrict the scope of protection in that sense, instead the words tea cup, tea material and tea compartment etc. are meant to cover all these other drinks as well.

DETAILED DESCRIPTION

Figure 1A:
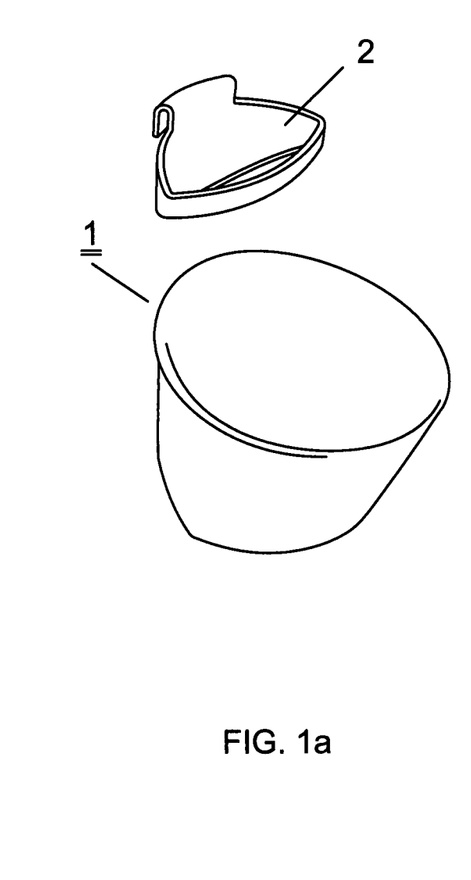
FIGS. 1a-1c shows an overall view of a first embodiment of the tea cup of the invention seen from above
Figure 1B:
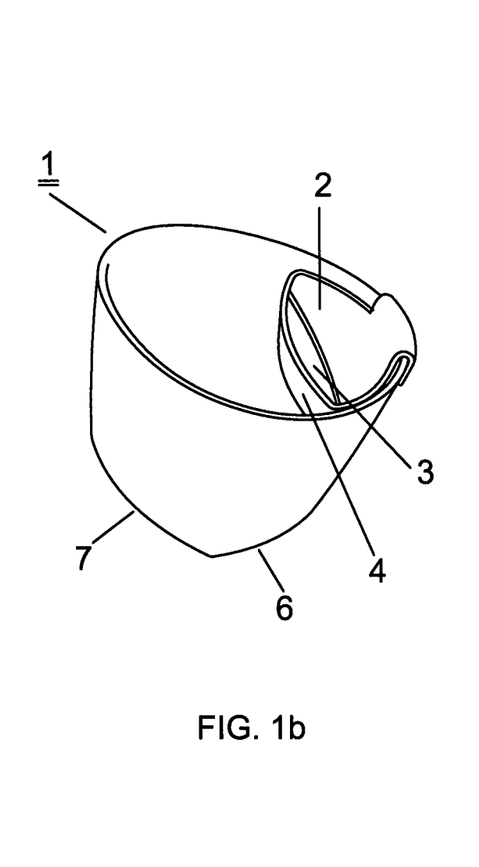
Figure 1C:
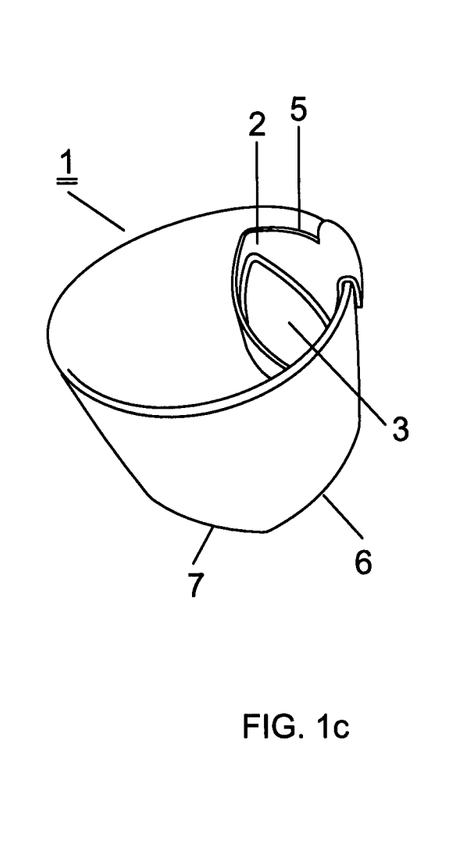

FIG. 1 shows an overall view of an embodiment of the tea cup of the invention seen from above. The tea cup 1 has a pocket part 2 with a sieve 3 for tea material. These two together 2, 3 form a tea compartment 4. The tea compartment 4 is attached to the inner wall 5 of the cup 1. The pocket part 2 can be attached to the inner wall 5 of the cup 1 even without the sieve 3, and the sieve 3 can be placed in the pocket afterwards. Part 2 is called pocket because, when attached to the inner wall 5 of the cup, it forms a pocket together with the inner wall 5. In this embodiment, the tea pocket 2 is detachably fastened to the inner wall of the tea cup 1. The two bottom sides on which the cup alternatively can lie on are indicated with reference numbers 6, 7. Preferably, there is a rim 10 at the edge of the tea compartment 4 to prevent tea leaves from falling while drinking tea if the tea compartment 4 is left in the cup 1 when drinking.

In FIG. 1a, the part forming the pocket 2 and the sieve 3 are detached and can be seen separately. In this embodiment of the invention, wherein the tea compartment is a detachable part, the pocket 2 with the sieve 3 can be detached for e.g. cleaning purposes.

In FIG. 1b, the part forming the pocket 2 with the sieve 3 has been inserted in the tea cup 1 and the tea cup 1 is ready for use. In accordance with the functional idea of the invention, the tea compartment 4 has to be placed on the upper part of the cup 1 on the same side as one of the bottom sides 6, 7, not on a side of the cup at which the bottom sides meet. Because then, when water is poured to a suitable level into the tea cup 1 and the tea cup 1 is tilted in one of the two positions so that it lies on bottom side 7, the tea compartment 4 is higher up above the water surface and the tea leaves are not in contact with the water. When the tea cup 1 is in the position of FIG. 2b, leaning on its bottom side 6 that is beneath the tea compartment 4, the tea material is in contact with the water phase and the tea making is on-going.

When, as in FIG. 1c, on the contrary, it is desired that the tea leaves are in contact with the water, the tea cup 1 is tilted so that it lies on bottom side 6, and can be in this position until the tea has the desired strength. This functionality is even improved by the curved shape of the tea cup 1, the sides of the cup at which the tea compartment 4 is and its opposite side being a little higher than the other sides. FIG. 1c shows the tea cup 1 of the invention seen from above placed in a second position, the tea cup 1 leaning on its second bottom side 7. The tea cup is kept in this position when the tea is ready and the concentration is right and when the tea has achieved the desired strength.

FIG. 2 shows an overall view of another embodiment of the tea cup of the invention seen from above. Like the cup in FIG. 1, the tea cup 1 has a pocket 2 with a sieve 3 for tea material. These two together constitute the tea compartment 4 attached to the inner wall 5 of the cup 1. In this embodiment, the tea pocket 2 is permanently and integrally fastened to the inner wall of the tea cup 1.

Figure 2A:
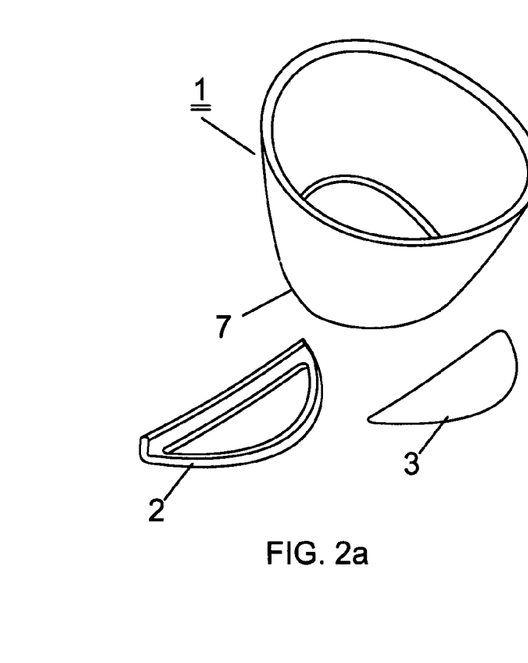
FIGS. 2a-2c shows an overall view of a second embodiment of the tea cup of the invention seen from above

In FIG. 2a, the part 4 forming the pocket 2 and the sieve 3 are detached and can be seen separately for illustration purposes. In such an embodiment of the invention, wherein the tea compartment 4 is a detachable part, the pocket 2 with the sieve 3 can be detached for e.g. cleaning purposes, but in the embodiment of FIG. 1, the pocket 2 with the sieve 3 is, integrally fastened to the inner wall 5 of the tea cup 1 and can not be detached.

Figures 2B, 2C:
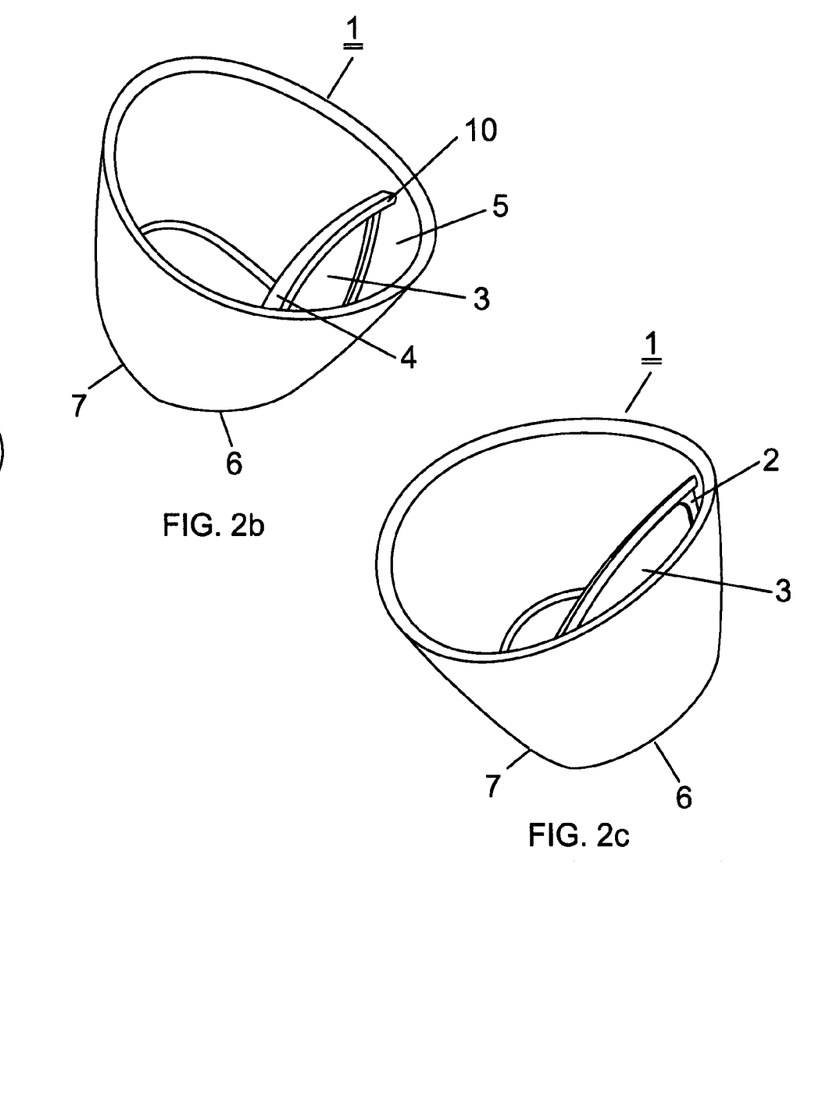

In FIG. 2b, the part forming the pocket 2 with the sieve 3 has been inserted in the tea cup 1 and the tea cup 1 is ready for use.

As the tea cup 1 of the invention has a functional shape with two bottom sides 6, 7, it can be placed in either one of two different positions. Therefore, the tea cup 1 is declined when it is standing in either of the two positions 6, 7.

When the tea cup 1 is in the position of FIG. 2b, leaning on its bottom side 6 that is beneath the tea compartment 4, the tea material is in contact with the water phase and the tea making is on-going.

FIG. 2c shows the tea cup 1 of the invention seen from above placed in a second position, the tea cup 1 leaning on its second bottom side 7. The tea cup is kept in this position when the tea is ready and the concentration is right and when the tea has achieved the desired strength.

The curved shape of the tea cup 1 of the embodiments of these figures can be seen from both FIGS. 1 and 2. The arcs at the upper part of the cup (at the tea compartment and its opposite side) go a little upwards at opposite ends of the cup and downwards at the other opposite ends.

Figure 3:
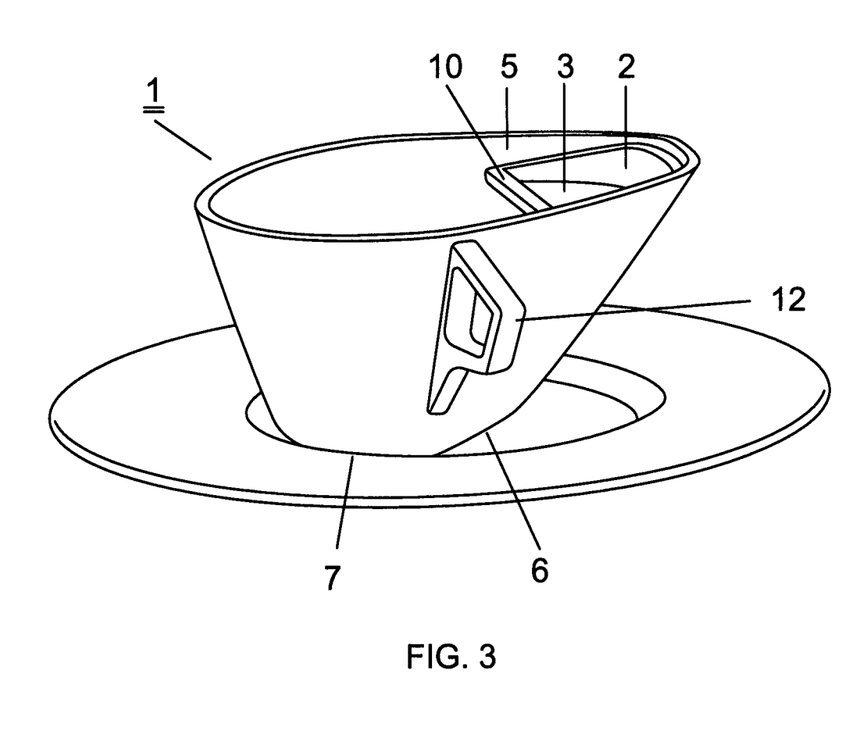
FIG. 3 shows an overall view of a third embodiment of the tea cup of the invention seen from the side

FIG. 3 shows an overall view of a third embodiment of the tea cup of the invention seen from the side. As in FIGS. 1-2, there is the tea cup of the invention with a pocket 2 with a sieve 3 for tea material. These two together 2, 3 form a tea compartment 4. The tea compartment 4 is attached to the inner wall 5 of the cup 1. In this embodiment, the tea pocket 2 is detachably fastened to the inner wall 5 of the tea cup 1. The two bottom sides 6, 7 on which the cup alternatively can lie on are indicated with reference numbers 6, 7.

The tea cup is in FIG. 3 in the tea-drinking position. This embodiment is also foreseen with a handle 12 on the outer wall of the cup 1.

FIGS. 4a-4f show more in detail the structural principal of an embodiment example presented in FIG. 1 seen from different directions. The same reference numbers as in the other figures have been used for the pocket 2, the sieve 3, the inner wall of the cup against which the tea compartment 4 lies, the handle 12 as well as for the bottom sides 6, 7.

In this example, the tea compartment 4 is detachable, as in FIG. 1, and there is a protruding edge 8 in the upper part of the tea cup for holding the cup with both hands. The can go around the whole cup or there can be e.g. two outgoing edges at a part of the cup on opposite sides.

Figure 4A:
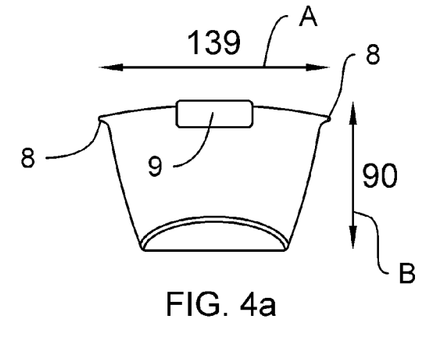
FIGS. 4a-4g shows the structural principal of the first embodiment of the tea cup of FIG. 1 of the invention seen from different directions

FIG. 4a shows the tea cup 1 of the invention seen from a certain side having one of the bottom sides 6 in front of the viewer. In FIG. 4a it can be seen that the tea compartment 4 is detachably fastened with a hook structure 9 so that the tea compartment is hanging on the upper edge of the tea cup 1. The cross-section breath of the cup, called "length" in this text, dimension A, inclusive the handle edge is in this direction, ca 14 cm, the height, dimension. B, being ca 9 cm. An example relation for these dimension is 13.9 cm/9 cm=1.54 cm.

Figure 4B:
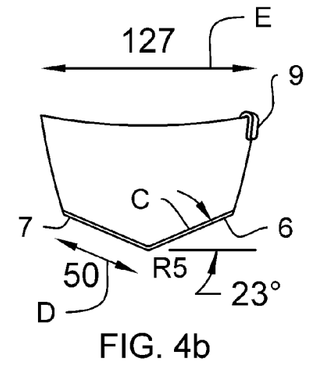

FIG. 4b shows the tea cup 1 of the invention seen from a side 90° turned to the left compared to FIG. 4a. The position of both bottom sides 6 and 7 can now be seen. Example dimensions for the two bottom sides 6, 7 (here equal in size) are, dimensions C and D=5 cm. The angle between the base on which the cup is standing and the bottom side is ca 20° and the upper breath of the cup (the distance between the side where the tea compartment is and the other opposite side), dimension E=ca 13 cm, e.g. 12.7 cm.

Figure 4C:
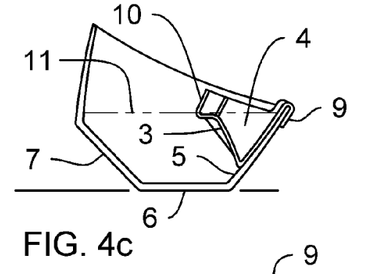

FIG. 4c shows the tea cup standing on one of its bottom sides 6, the one that is beneath the tea compartment 4. In this position, the tea material is in contact with the water and the tea making is on-going. Preferably, there is a rim 10 at the edge of the tea compartment 4 to prevent tea leaves from falling while drinking tea if the tea compartment 4 is left in the cup 1 when drinking. It can be seen from FIG. 4c that the water surface 11 is on a level that the tea leaves are in contact with the water.

Figure 4D:
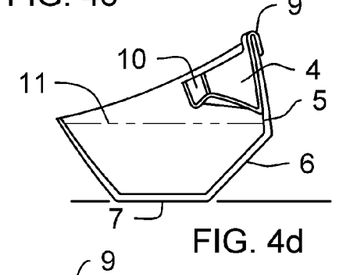

FIG. 4d shows the tea cup standing on the other bottom side 7. The tea cup 1 is kept in this position when the tea is ready and the concentration is right and when the tea has achieved the desired strength. It can be seen from FIG. 4d that the water surface 11 is on a level under the tea compartment 4 preventing the tea leaves from contact with the water, when the tea already has achieved the desired strength.

Figure 4E:
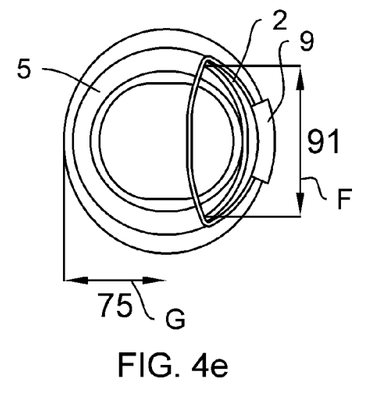

FIG. 4e presents this tea cup seen from above. The radius uptaken by the tea compartment 4, dimension F, is in this figure ca 9 cm and the free space in the cup outside for drinking has a length of ca 7.5 cm, dimension G working well for most people. Dimension G has to be long enough so that the nose would not touch the other side of the cup, i.e. the tea compartment at drinking.

Figure 4F:
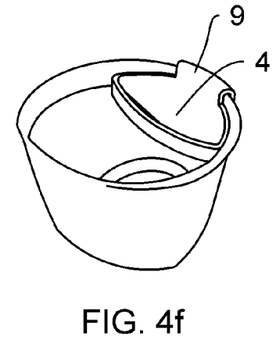
Figure 4G:
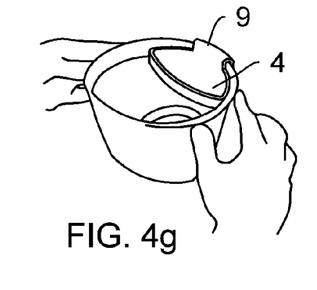

In FIGS. 4f and 4g, the tea cup is presented as seen from above with the tea compartment 4 in place ready for use. FIG. 4g shows how it can be grabbed.

Figure 5A:
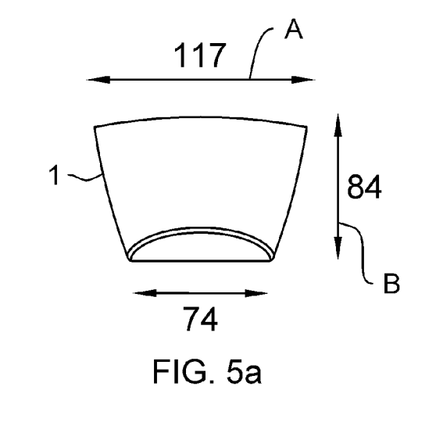
FIGS. 5a-5f shows the structural principal of a first embodiment of the tea cup of FIG. 2 of the invention seen from different directions

FIG. 5a shows the tea cup 1 of the invention seen from a certain side having one of the bottom sides 6 in front of the viewer. The cross-section breath of the cup, dimension A, is in this direction, ca 12 cm, the height, dimension B, being ca 8.5 cm. An example relation for these dimension is like in this FIG. 11.7 cm/8.4 cm=1.39 cm.

Figure 5B:
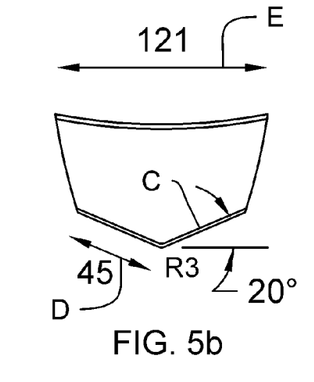

FIG. 5b shows the tea cup 1 of the invention seen from a side 90° turned to the left compared to FIG. 5a. Both bottom sides 6 and 7 can now be seen from the side. Example dimensions from the two bottom sides 6, 7 (preferably equal in size) are, dimensions C and D=4.5 cm. The angle between the base on which the cup is standing and the bottom side is ca 20° and the upper breath of the cup (the distance between the side where the tea compartment is and the other opposite side), dimension E=ca 120 cm, e.g. 121 cm.

Figure 5C:
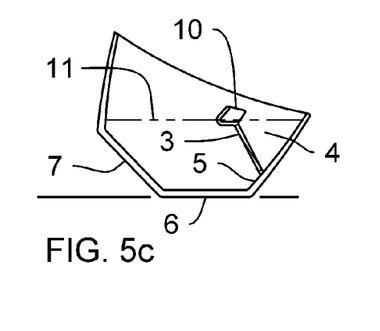

FIG. 5c shows the tea cup standing on one of its the bottom sides 6, the one that is beneath the tea compartment 4. In this embodiment, the tea compartment if formed by a part forming a pocket fastened to the inner wall 5 an having a rim 10. In this position, the tea material is in contact with the water and the tea making is on-going. The rim 10 is at the edge of the tea compartment 4 to prevent tea leaves from falling while drinking tea if the tea compartment 4 is left in the cup 1 when drinking. It can be seen from FIG. 6c that the water surface 11 is on a level that the tea leaves are in contact with the water.

Figure 5D:
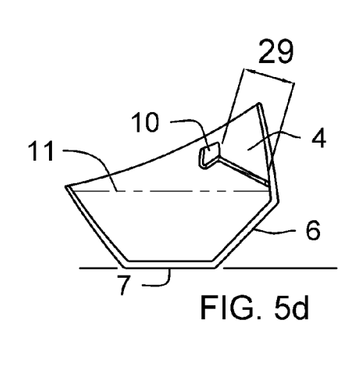

FIG. 5d shows the tea cup standing on the other bottom side 7. The tea cup 1 is kept in this position when the tea is ready and the concentration is right and when the tea has achieved the desired strength. It can be seen from FIG. 5d that the water surface 11 is on a level under the tea compartment 4 preventing the tea leaves from contact with the water, when the tea already has achieved the desired strength.

Figure 5E:
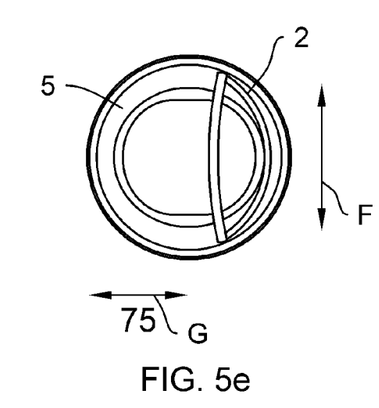

FIG. 5e presents this tea cup seen from above. The radius uptaken by the tea compartment 4, dimension F, is in this figure ca 7.7 cm and the free space in the cup outside for drinking has a length of ca 7.5 cm, dimension G, so that the nose would not touch the other side of the cup, i.e. the tea compartment at drinking.

Figure 5F:
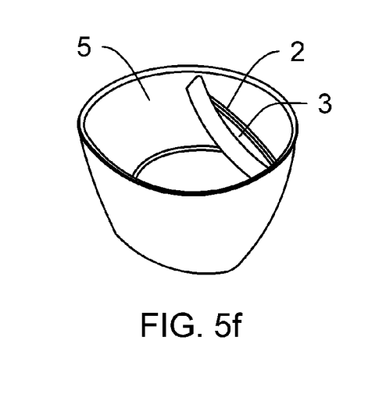

In FIG. 5f, the tea cup is presented to be seen from above with the tea compartment 4 integrally fastened.

FIGS. 6a-6f show more in detail the structural principal of an embodiment example, presented in FIG. 3 seen from different directions. In this example, the tea compartment 4 is fastened to the tea cup 1, as in FIG. 3.

Figure 6A:
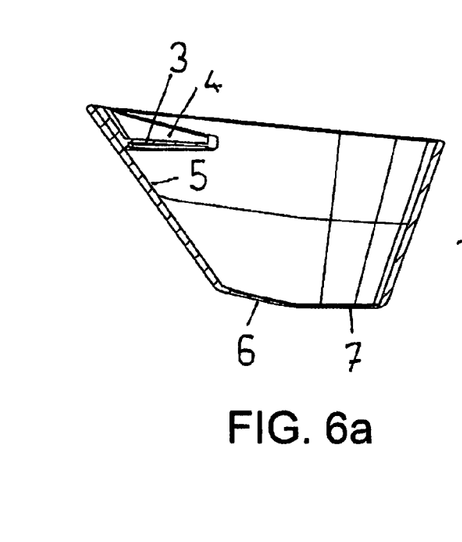
FIGS. 6a-6c shows the structural principal of a first embodiment of the tea cup of FIG. 3 of the invention seen from different directions
Figure 6B:
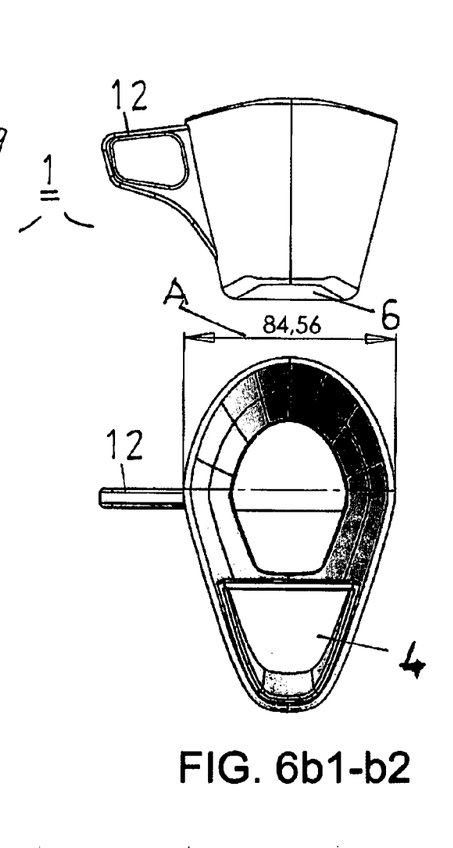

FIG. 6a shows this embodiment in cross-section so that the tea department can be seen. The same reference numbers as in the other figures have been used for the pocket 2, the sieve 3, the inner wall of the cup against which the tea compartment 4 lies, the handle 12 as well as for the bottom sides 6, 7.

FIG. 6b1 shows this embodiment of the tea cup 1 of the invention seen from a certain side having one of the bottom sides 6 in front of the viewer. FIG. 6b2, which is connected in scale to FIG. 6b1 shows the tea cup from above. The cross-section breath of the cup, dimension A, inclusive exclusive the handle is in this direction, ca 8.5 cm, the height on the tea department side, dimension H, being ca 8 cm (See FIG. 6c). An example relation for these dimension is 8.456 cm/7.983=1.06 cm. In opposite to FIGS. 1 and 5, dimension E is here bigger than dimension A. Furthermore, the height on the tea department side, dimension H, is bigger than dimension E on the opposite side.

Figure 6C:
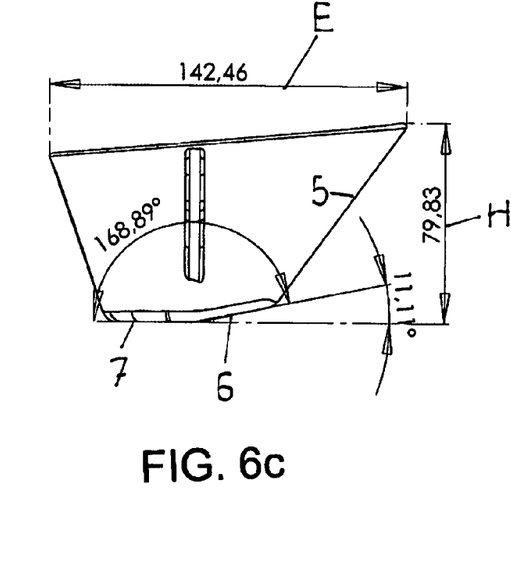

FIG. 6c shows the tea cup 1 of the invention seen from a side 90° turned to the left compared to FIG. 6a. The position of both bottom sides 6 and 7 can now be seen. The angle between the base on which the cup is standing and the bottom side is ca 11.11° and the upper breath of the cup (the distance between the side where the tea compartment is and the other opposite side), dimension E=ca 14 cm, e.g. 14.246 cm. E/H=ca 1.8.

The invention claimed is:

1. A beverage cup for drinking and brewing a beverage, said beverage cup comprising:
   a compartment having a sieve, said compartment defining a pocket configured to receive a brewing material;
   a V-like-shaped base having a least two base sides enabling said beverage cup to be placed in at least two separate standing positions being a first position for brewing said brewing material when said beverage cup is standing on one of said base sides, and a second position for drinking the beverage: and
   a curve shaped edge which follows a fluid level at all positions from said first position to said second position and in-between, said curve shaped edge facilitates a tilting of said beverage cup by preventing fluid in said beverage cup from running over said curve shaped edge when tilted back and forth between said first and second positions;
   wherein said compartment being associated with an inner wall of said beverage cup and an upper part of said beverage cup on a same side as one of said base sides, enabling said compartment to be under the fluid level in said beverage cup when in said first position, and above the fluid level in said beverage cup when said beverage cup is standing in said second position, enabling a user to regulate a strength of the brewed beverage.

2. The beverage cup according to claim 1, wherein said compartment being one of integrated to said upper part of said beverage cup, and detachable from said upper part of said beverage cup.

3. The beverage cup according to claim 1, wherein said beverage cup is symmetric along a vertical mid axle of said beverage cup, and said two base sides are equal in length.

4. The beverage cup according to claim 1, wherein said beverage cup has one of a width to a height relation of 1.3-1.7 cm, and a depth to said height relation of 1.3-1.7 cm.

5. The beverage cup according to claim 1, wherein said beverage cup has one of a width to height relation of 1.5 cm, and a depth to height relation of 1.5 cm.

6. The beverage cup according to claim 4, wherein said beverage cup has an upper breath that is a length distance between opposite sides of said inner wall where said compartment is, said upper breath having a length larger than said width and said height on said inner wall side including said compartment.

7. The beverage cup according to claim 6, wherein a radius uptaken by said compartment is larger than said height.

8. The beverage cup according to claim 1, wherein said beverage cup is made of a material selected from the group consisting of ceramics, plastics, metals, alloys, and composites.

9. The beverage cup according to claim 1, wherein said beverage cup has a cavity defined in at least one of said base sides for holding said beverage cup in a hand.

10. The beverage cup according to claim 1, wherein said beverage cup further comprising an edge at an upper part of said beverage cup for holding said beverage cup.

11. The beverage cup according to claim 1, wherein said beverage cup further comprising a handle on an outer wall of said beverage cup.

12. The beverage cup according to claim 1, wherein said beverage cup further comprising a double-wall insulating structure.

13. The beverage cup according to claim 1, wherein said beverage cup further comprising a lid covering at least said compartment.

14. The beverage cup according to claim 1, wherein said pocket further comprising a rim at an edge of said compartment to prevent said brewing material from falling while in said second position.

15. The beverage cup according to claim 1 further comprising a temperature indicator associated with a side of said beverage cup, which indicates fluid temperatures for different types of said brewing material when in said second position and indicates when to tilt to said beverage cup to said first position at a predetermined temperature.

16. A method of manufacturing a beverage cup with two bottom sides and having a compartment with a sieve for brewing material, said method comprising the steps of:
   a) manufacturing a cup and said compartment separately;
   b) manufacturing a V-like-shaped base of said cup so as to have at least two planar sides;
   c) manufacturing a curve shaped edge which follows a fluid level at all positions from a first position to a second position and in-between, said curve shaped edge facilitates a tilting of said beverage cup by preventing fluid in said beverage cup from running over said curve shaped edge when tilted back and forth between said first and second positions;
d) fastening said sieve to said compartment; and
e) placing said compartment to an inner wall of said cup on a same side as one of said base sides;
wherein said compartment being associated with an inner wall of said beverage cup and an upper part of said beverage cup on a same side as one of said base sides, enabling said compartment to be under the fluid level in said beverage cup when in said first position, and above the fluid level in said beverage cup when said beverage cup is standing in said second position, enabling a user to regulate a strength of the brewed beverage.

17. The method according to claim 16, wherein said cup and said department are separately manufactured by injection molding, said sieve is fastened to said compartment by ultrasonic welding during said injection molding step, and said compartment is welded said inner wall of said cup.

18. The method according to claim 16, wherein said cup and said department are separately manufactured by one of injection molding, and throwing molding, said sieve is fastened to said compartment by ultrasonic welding, and said compartment is configured to be detachably placed to said inner wall of said cup.

\* \* \* \* \*